United States Patent
Viola et al.

(10) Patent No.: US 8,640,570 B2
(45) Date of Patent: Feb. 4, 2014

(54) FLAT PROTECTIVE COVER WITH TWO DEGREES OF FREEDOM FOR TOOL MACHINES

(75) Inventors: Riccardo Viola, Solarolo Rainerio (IT); Tommaso Viola, San Giovanni In Croce (IT)

(73) Assignee: La Protec SRL, San Giovanni in Croce (CR) (IT)

( * ) Notice: Subject to any disclaimer, the term of this patent is extended or adjusted under 35 U.S.C. 154(b) by 0 days.

(21) Appl. No.: 13/499,316

(22) PCT Filed: Sep. 21, 2010

(86) PCT No.: PCT/IB2010/002478
§ 371 (c)(1),
(2), (4) Date: Mar. 30, 2012

(87) PCT Pub. No.: WO2011/039618
PCT Pub. Date: Apr. 7, 2011

(65) Prior Publication Data
US 2012/0186389 A1    Jul. 26, 2012

(30) Foreign Application Priority Data
Oct. 2, 2009 (IT) ................... CR09A0041

(51) Int. Cl.
*F16P 1/00* (2006.01)
(52) U.S. Cl.
USPC .......................................................... 74/612
(58) Field of Classification Search
USPC ......... 74/608, 612, 613; 52/67; 160/201, 202, 160/222, 223; 409/134; 408/241 G; 451/451
See application file for complete search history.

(56) References Cited

U.S. PATENT DOCUMENTS

| | | | | |
|---|---|---|---|---|
| 3,429,356 A | * | 2/1969 | Haschek et al. | 160/223 |
| 6,116,830 A | * | 9/2000 | Azema | 409/134 |
| 6,260,438 B1 | * | 7/2001 | Tabellini | 74/612 |
| 6,481,313 B1 | * | 11/2002 | Tabellini | 74/612 |
| 2006/0225848 A1 | * | 10/2006 | O'Rourke et al. | 160/223 |

FOREIGN PATENT DOCUMENTS

| | | |
|---|---|---|
| DE | 198 31 802 A1 | 1/1999 |
| DE | 199 46 771 A1 | 4/2000 |
| EP | 0 836 909 A1 | 4/1998 |
| EP | 1 090 714 A2 | 4/2001 |
| EP | 1 178 258 A1 | 2/2002 |

OTHER PUBLICATIONS

International Search Report, dated Jan. 12, 2010, from corresponding PCT application.

* cited by examiner

*Primary Examiner* — Vicky Johnson
(74) *Attorney, Agent, or Firm* — Young & Thompson

(57) ABSTRACT

Flat protective cover (1) with two degrees of freedom for tool machines, which can be associated with an operating member (A) movable along at least two main directions (D1, D2), includes:
- at least a first flat covering element (2), operatively connected to the operating member (A);
- at least a second flat covering element (3);
- guide and retaining elements (5a, 5b, 6a, 6b, 7a, 7b, 8a, 8b) to mutually couple in a sliding way the covering elements, wherein the protective cover (1) further includes an intermediate frame (4) between the first (2) and second (3) flat covering element, arranged for allowing mutual sliding of the flat elements (2,3) along the two mutually orthogonal main directions (D1, D2), and the guide and retaining elements (5a, 5b, 6a, 6b, 7a, 7b, 8a, 8b) include pairs of linear guides (5a, 5b, 6a, 6b) arranged for co-operating by mutual sliding with pairs of blades (7a, 7b, 8a, 8b).

11 Claims, 3 Drawing Sheets

FLAT PROTECTIVE COVER WITH TWO DEGREES OF FREEDOM FOR TOOL MACHINES

BACKGROUND OF THE INVENTION

1. Field of the Invention

The invention relates to the field of accessory mechanical components for tool machines.

In particular, the invention relates to a flat protective cover with two degrees of freedom for tool machines, which can be associated with an operating member movable along two or three directions within a defined operating area.

2. Description of the Related Art

In general, flat protective covers of this kind are suitable for protecting the operating area within which the operating member of the tool machine moves from external elements that could jeopardize the efficiency and duration of the same machine. Such protective covers, in fact, are a valid repair against dirt, chips, coolants, emulsions, accidental tool collisions, etc.

A widespread type of said flat protective covers comprises a first covering element, fixed to said machine in correspondence to the zone to be protected, a second movable covering element, operatively connected to said operating member, and optionally one or more intermediate covering elements movable relative to each other and relative to said first and second covering element. In particular, the outermost machine element has a frame shape, which can easily contain within its thickness the space occupied by all the other flat elements constituting the protection with concentric elements.

Each covering element, preferably made of a metal material, for example steel, has an opening for the passage of said operating member. Said opening has a substantially rectangular shape for all the elements, except for the last element the opening whereof is substantially circular, so as to allow the passage of the shaft of the machine operating member. The shaft moves in a plane pulling the cover and can slide within the same cover in a third direction orthogonal to the same plane.

Said traditional flat protective covers further comprise guide and retaining means, the function whereof, on the one side, is to slidingly couple said covering elements to each other so as to follow said operating member in its operating movements and cover the zone to be protected, and the other side it is to retain all the covering elements relatively tightened to one another in a packet configuration. In particular, each covering element is associated with at least one guide and retaining element that facilitates the sliding of the same element along a first direction, and at least one guide and retaining element that facilitates the sliding of the same in a second direction orthogonal to the first one.

A protective cover is known from patent EP 1 178 258 A1, wherein each flat element has a turned up frame that serves as a guide for the adjacent element along a first direction, and at least one appendix arranged for slidingly cooperating along a second direction with suitable tracks also provided on the adjacent element.

These types of telescopic protections have some limits and drawbacks.

Said covering elements and guide and retaining means, shaped as described above, impart a relatively large thickness to the flat protective cover, thus making it considerably bulky for the entire tool machine and heavy for the operating member it is operatively associated with.

Even more disadvantageously, the increased weight of said flat elements contributes to slowing down the telescopic movement, with problems for the production and relative economic drawbacks.

A further drawback of these traditional flat protective covers is the difficulty of providing, on the single covering elements, if not by considerably increasing thickness, cleaning means, such as for example brass sheets and scrapers, which are very important for keeping a good cleaning of the walls from chips, oils or coolants that may wear out, scratch and damage the protection components and the operating member.

BRIEF SUMMARY OF THE INVENTION

The aim of the invention is to overcome these limits.

The aim of the invention is to provide a flat protective cover with two degrees of freedom for tool machines, which can be associated with an operating member movable bidirectionally within a defined operating area, which should be little cumbersome, with reduced thickness, easy to manufacture and as easy to maintain.

It is also an object of the invention to provide a flat protective covering whereon the accessory means may be easily mounted as required for a good cleaning of the operating member and consequently, for a correct machine operation, without increasing the dimensions and thickness thereof.

A further aim of the invention is to improve the performance of the operating member making the movement thereof bidirectional, quick and noiseless, within the operating area.

Finally, it is aim of the invention to impart modularity to the flat protective cover which should allow easy assembly and removal to the operators and which should optionally simplify the part replacement operations, also favoring the component interchangeability, to better adapt them to any user's requirements.

The aims are achieved with a flat protective cover with two degrees of freedom for tool machines, which can be associated with an operating member movable along at least two main directions, comprising:
- at least a first flat covering element, operatively connected to said operating member, and provided with a respective opening for passage of said member;
- at least a second flat covering element, which can be fixed to said tool machine in correspondence to the area to be protected, and provided with a respective opening for passage of said member;
- guide and retaining means to mutually couple in a sliding way said at least one first and at least one second covering element, characterized in that said protective cover further comprises:
- an intermediate frame between said at least one first and at least one second flat covering element, arranged for allowing mutual sliding of said flat elements along the two mutually orthogonal main directions, and said guide and retaining means comprise:
- a first pair of linear guides steadily associated with said at least one first flat covering element and arranged along a first direction;
- a second pair of linear guides steadily associated with said intermediate frame and arranged along a second direction orthogonal to said first direction;
- a first pair of blades steadily associated with said intermediate frame and arranged along a first direction;

a second pair of blades steadily associated with said at least one second flat covering element and arranged along a second direction;

wherein said first pair of blades is slidingly associated with said first pair of linear guides and said second pair of blades is slidingly associated with said second pair of linear guides.

According to a possible embodiment of the invention, said flat protective cover further comprises:

a third flat covering element provided with a respective opening for passage of said operating member;

a second intermediate frame between said at least one second and said third covering element, arranged for allowing mutual sliding of said flat elements along the two main mutually orthogonal directions, and said guide and retaining means further comprise:

a third pair of linear guides steadily associated with said at least one second covering element and arranged along said second direction;

a fourth pair of linear guides steadily associated with said second frame and arranged along said first direction;

a third pair of blades steadily associated with said second intermediate frame and arranged along a first direction;

a fourth pair of blades steadily associated with said third flat covering element and arranged along a second direction, wherein said third pair of blades is slidingly associated with said third pair of linear guides and said fourth pair of blades is slidingly associated with said fourth pair of linear guides.

Advantageously, said flat protective cover may comprise a plurality of flat covering elements, intermediate frames and guide and retaining means, arranged for producing a modular sequence of appropriate extension.

According to preferred aspects of the invention, said linear guides are elongated elements with L-shaped section, said blades are made by depressed portions, produced in the thickness of said flat covering elements and of said intermediate frames.

According to further preferred aspects of the invention, said guide and retaining means comprise sliding means arranged for reducing sliding friction between the parts in mutual contact.

According to an embodiment of the invention, said first and third pair of linear guides face the respective openings of said at least a first and at least a second covering element; said second and fourth pair of linear guides face the side opposite said first and third pairs of linear guides; said second and fourth pairs of blades face the respective openings of said at least a second and third covering element; said first and third pairs of blades face the side opposite said second and fourth pairs of blades.

The advantages of the invention are several and clear.

Said flat protective cover has a reduced overall thickness thanks to the type of guide and retaining means used and to their method of fixing on the single covering elements. As a consequence, its weight is much reduced and advantageously, the reaction and operating speed of the entire tool machine is higher, the production and the relevant costs are optimised.

Said protection may advantageously be fitted, without increasing the overall thickness thereof, but using that of the intermediate frames, with suitable cleaning means, for example brasses and scrapers, very important for keeping a good cleaning of the walls from chips, oils and coolants that may wear, scratch and damage the protection components or the operating member.

The simple structure of said flat protective cover requires little processing of the single covering elements, and does not force to shaping the larger final element box-like for containing the guide and retaining means: advantageously, said protection is entirely removable from the outside of the tool machine without interfering with the operating member, facilitating any operations for the maintenance and replacement of some parts.

Moreover, said flat protective cover has a modular structure which allows a very flexible design thereof, easily adjusting to any conditions and requirements of the users and to any configurations of tool machines and of the respective operating members in use.

Even more advantageously, said protective cover may be standardized, that is, while each covering element has different dimensions, they may be fitted with guide and retaining means having all the same dimensions, speeding up production and reducing the costs thereof. Moreover, each guide and retaining means only cooperates with two flat covering elements, allowing quick interchangeability of the same guide means, suitably selected according to the machine weight or to the operating speeds and easily replaceable.

BRIEF DESCRIPTION OF THE DRAWINGS

These and other advantages shall be more evident from the following description of a preferred embodiment of the invention, made by way of a non-limiting example, with the help of figures, wherein.

DETAILED DESCRIPTION OF THE PREFERRED EMBODIMENTS

Figure 1:
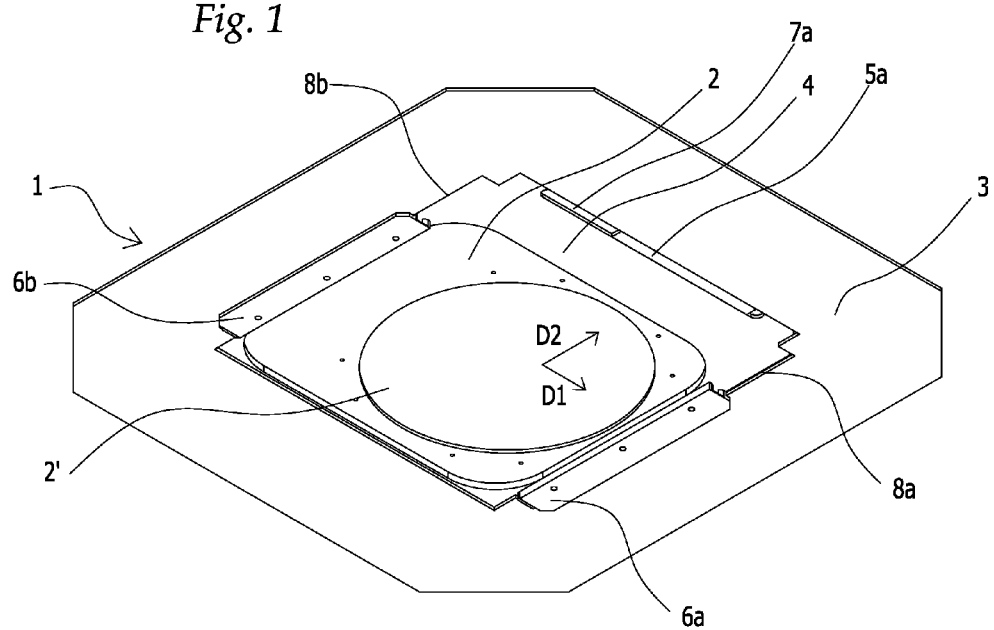
FIG. 1 shows an axonometric view, from within the machine it is applied to, of the flat protective cover according to the invention.
Figure 3:
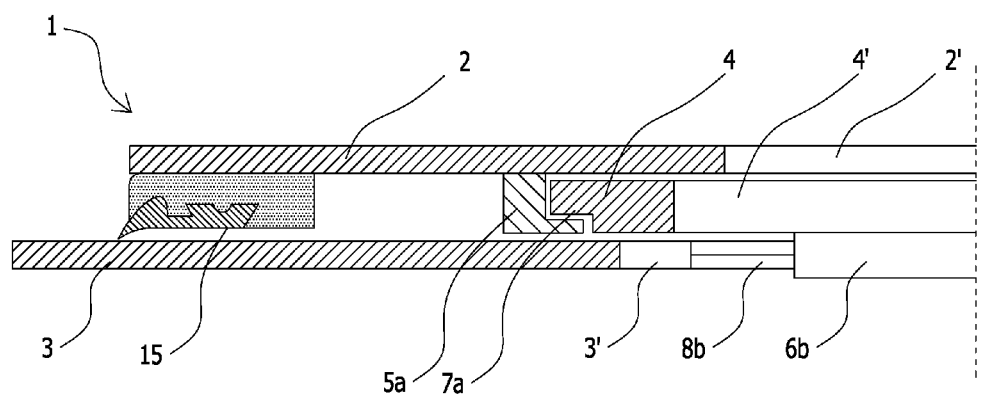
FIG. 3 shows a partially cutaway view of a detail of the invention.

With reference to FIGS. 1 and 3, there is shown a flat protective cover 1 with two degrees of freedom, acting along two main directions D1 and D2 orthogonal to one another, which can be associated with a movable operating member A operating on predetermined tool machines.

Said protection 1 comprises a first flat covering element 2, a second flat covering element 3 and an intermediate frame 4 between said first and said second flat element.

Said first flat covering element 2 is provided with an opening 2' for the passage of said operating member A operatively connected whereto, optionally so that the operating member A is freely sliding within said opening 2'.

Said second flat covering element 3 is fixed to said tool machine in correspondence to the zone to be protected, and is also provided with a respective opening 3' for passage of said operating member A.

Said frame 4, delimiting an intermediate opening 4' between said first 2 and second 3 flat covering element, is arranged for allowing mutual sliding of said flat elements 2 and 3 along the two mutually orthogonal directions D1 and D2.

Said protective cover 1 further comprises guide and retaining means 5a, 5b, 6a, 6b, 7a, 7b, 8a, 8b arranged for mutually coupling in a sliding way said covering elements 2 and 3 and said frame 4.

In particular, said guide and retaining means 5a, 5b, 6a, 6b, 7a, 7b, 8a, 8b comprise two pairs of linear guides 5a, 5b and 6a, 6b consisting of elongated elements having an L-shaped section: a first pair of linear guides 5a, 5b is steadily associated with said first flat covering element 2 and is arranged along a first direction D1, a second pair of linear guides 6a, 6b is steadily associated with said intermediate frame 4 and is arranged along a second direction D2 orthogonal to said first direction D1.

Moreover, said guide and retaining means 5a, 5b, 6a, 6b, 7a, 7b, 8a, 8b comprise two pairs of blades 7a, 7b and 8a, 8b: a first pair of blades 7a, 7b is steadily associated with said intermediate frame 4 and is arranged along a first direction D1, a second pair of blades 8a, 8b is steadily associated with said second flat covering element 3 and is arranged along a second direction D2. Said pairs of blades 7a, 7b and 8a, 8b are made by depressed portions, produced in the thickness of the flat covering element 3 and of the intermediate frame 4 whereto they belong.

According to the assembly method shown, said first pair of linear guides 5a, 5b faces opening 2' of said first flat covering element 2; said second pair of linear guides 6a, 6b, on the other hand, faces the side opposite said first pair of linear guides 5a, 5b. Said second pair of blades 8a, 8b faces opening 3' of said second flat covering element 3; said first pair of blades 7a, 7b, on the other hand, faces the side opposite said second pair of blades 8a, 8b.

Figure 2:
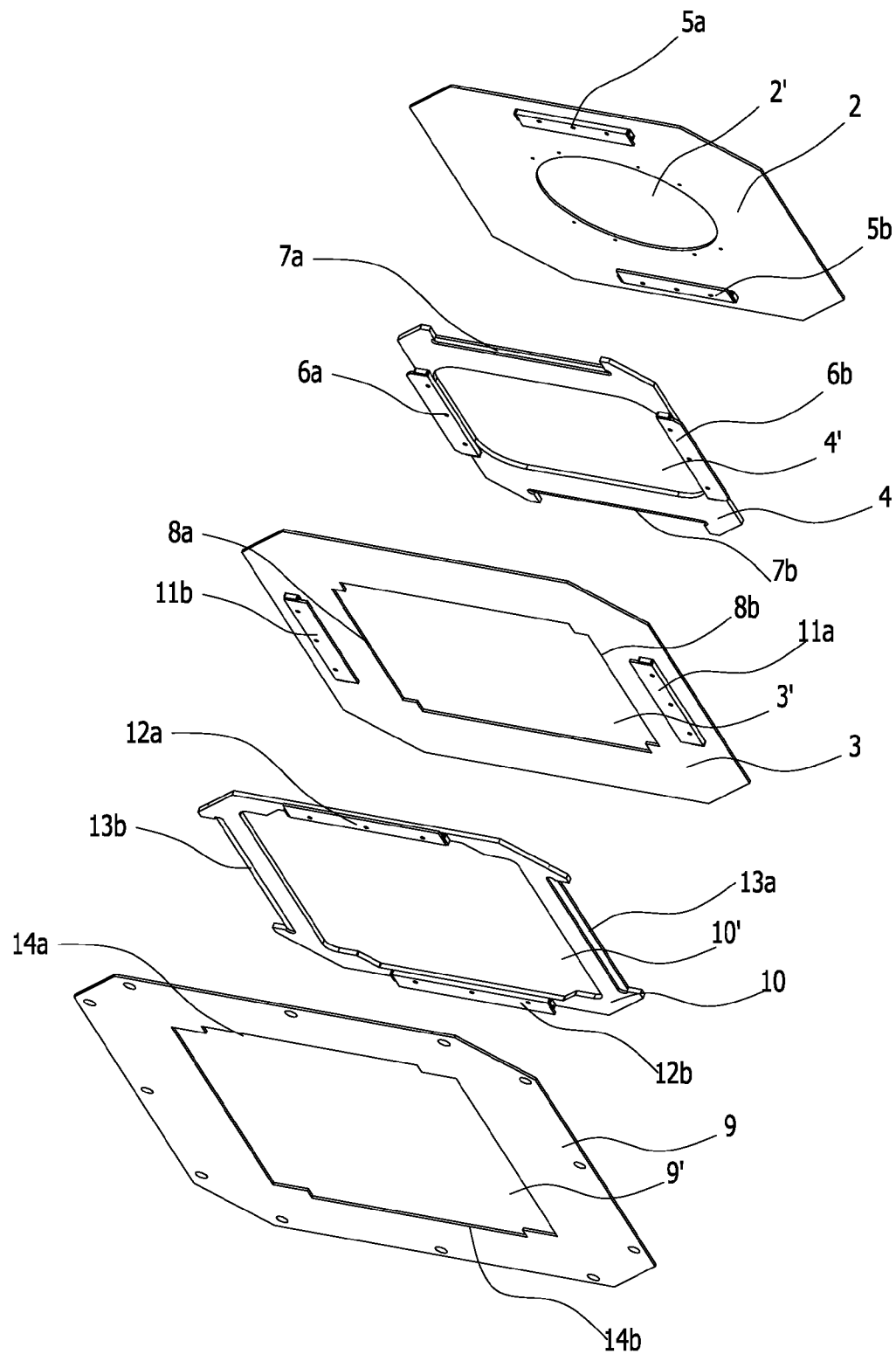
FIG. 2 shows an axonometric exploded view of the flat protective cover of FIG. 1.

With reference to FIG. 2, the flat protective cover 1 comprises a plurality of flat covering elements, intermediate frames and guide and retaining means, arranged for producing a modular sequence of appropriate extension of said protection according to the dimensions of the plane wherein the operating member A moves.

In particular, besides comprising all the elements shown in FIG. 1, the flat protection 1 is further provided with a third flat covering element 9 provided with a respective opening 9' for the passage of the operating member A, and with a second intermediate frame 10 between said second 3 and third 9 covering element.

Said intermediate frame 10 is also arranged for allowing mutual sliding of said second 3 and third 9 flat elements along the two mutually orthogonal main directions D1 and D2.

The flat protection 1 is provided with further guide and retaining means 11a, 11b, 12a, 12b, 13a, 13b, 14a, 14b.

A third pair of linear guides 11a, 11b is steadily associated with said second flat covering element 3 and is arranged along said second direction D2; a fourth pair of linear guides 12a, 12b, on the other hand, is steadily associated with said frame 10 and is arranged along said first direction D1.

A third pair of blades 13a, 13b is steadily associated with said second intermediate frame 10 and is arranged along a first direction D1; a fourth pair of blades 14a, 14b, on the other hand, is steadily associated with said third flat covering element 9 and is arranged along a second direction D2.

According to the assembly method shown, said third pair of linear guides 11a, 11b faces opening 9' of said third flat covering element 9; said fourth pair of linear guides 12a, 12b, on the other hand, faces the side opposite said first pairs of linear guides 11a, 11b. Said fourth pair of blades 14a, 14b faces opening 9' of said third flat covering element 9; said third pair of blades 13a, 13b, on the other hand, faces the side opposite said fourth pair of blades 14a, 14b.

With particular reference to FIG. 3, there are shown cleaning means 15 suitable for keeping the surface of the flat covering elements clean, and preventing chips or liquid residues from coming into contact with the operating member and the various components of the tool machine. Said cleaning means 15 comprise brass sheets or tabs of a flexible material and are associated with the face of the flat covering element 2 facing the zone to be protected, and arranged along all the outer sides of said flat element 2. Said cleaning means 15 act on the face facing opposite the zone to be protected, of the flat element 3 adjacent that they belong to, and the thickness thereof is substantially equal to the thickness of the intermediate frame 4 arranged between said adjacent elements 2 and 3.

Figure 4:
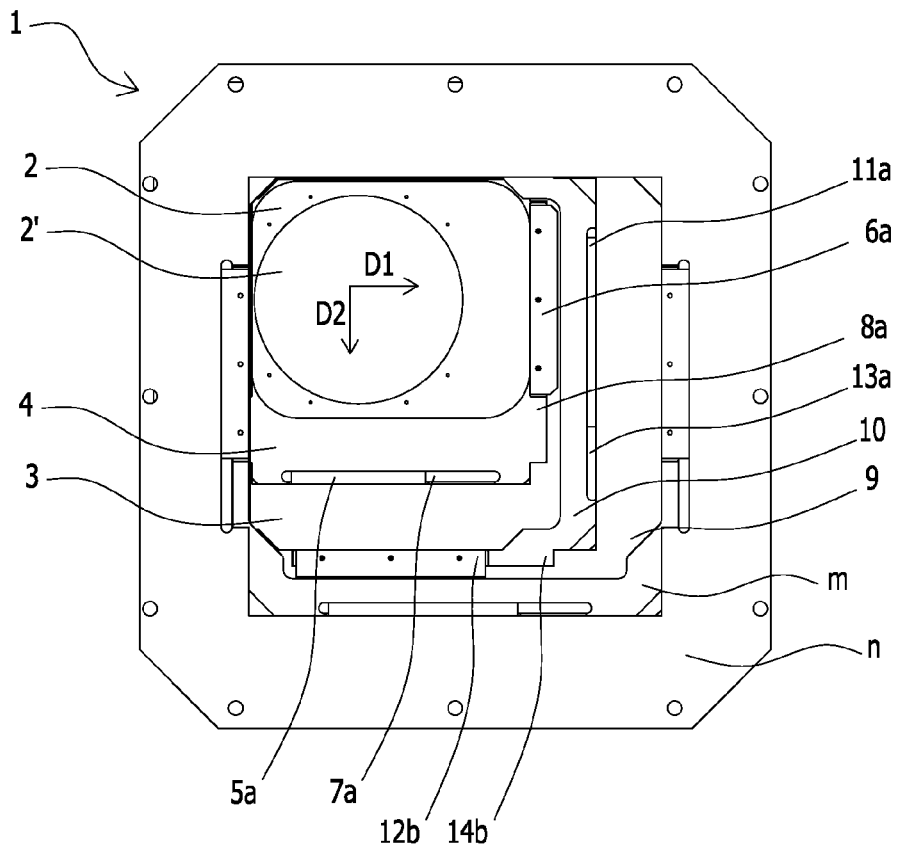
FIG. 4 shows an axonometric view from within the machine, of the flat protective cover according to a possible embodiment version.
Figure 5:
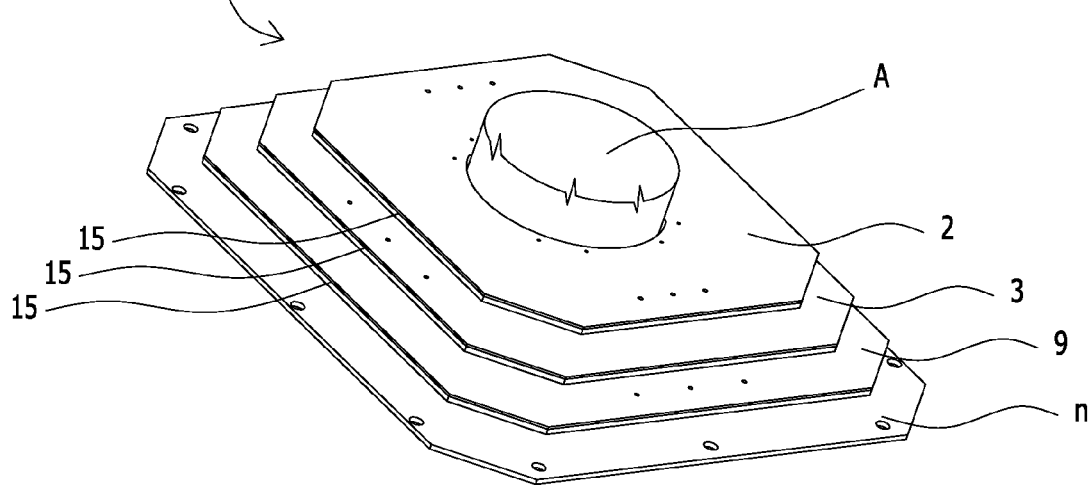
FIG. 5 shows an axonometric view from outside the machine, of the flat protective cover of FIG. 4.

FIGS. 4 and 5 show a flat protective cover consisting of four flat covering elements and three intermediate frames, assembled to one another so as to allow the operating member A to move within a wide protected zone.

According to possible variants, not shown, said guide and retaining means may comprise sliding means, for example runners, suitable for reducing the sliding friction between the parts in mutual contact.

According to further possible variations, not shown, said flat protective cover may comprise accessory means acting as collision bumpers for said flat covering elements. In particular, said bumper accessory means comprise at least one elastic stop positioned in correspondence with each blade and suitable for cooperating with the linear guide sliding on said blade.

The operation of the invention is described below.

Each flat covering is kinematically connected to the other ones, which are adjacent thereto, so that subsequent to a movement of the operating member associated with the tool machine, the element operatively associated to said member also pulls the other flat covering elements therewith, along the two main orthogonal directions D1 and D2, in a succession, which mutually sliding, thanks to the guide and retaining means, keep the operating zone closed and protected during the movements of the operating member.

The particular L shape of the guides further allows retaining the flat elements and allowing the movement of the operating member A in a direction orthogonal to the protective cover plane.

Of course, the principle of the invention being understood, the embodiments, the materials used, the dimensions and the construction details may widely vary compared to what described and shown, according to the application requirements, without departing from the scope of the present invention.

The invention claimed is:

1. A flat protective cover with two degrees of freedom for tool machines, which can be associated with an operating member movable along at least two main directions, the flat protective cover comprising:
   at least a first flat covering element, operatively connected to said operating member, and provided with a respective opening for passage of said member;
   at least a second flat covering element, which can be fixed to said tool machine in correspondence to the area to be protected, and provided with a respective opening for passage of said member;
   an intermediate frame between said at least one first and at least one second flat covering element configured to allow mutual sliding of said flat elements along the two mutually orthogonal main directions; and
   guide and retaining means for mutually coupling in a sliding way said at least one first and at least one second covering element; said guide and retaining means comprising:
   a first pair of linear guides connected with said at least one first flat covering element and arranged along a first direction, a second pair of linear guides connected with said intermediate frame and arranged along a second direction orthogonal to said first direction, a first pair of blades connected with said intermediate frame and arranged along the first direction, the first pair of blades being slidingly associated with said first pair of linear guides, and a second pair of blades connected with said at least one second flat covering element and arranged along the second direction, said second pair of blades being slidingly associated with said second pair of linear guides.

2. The flat protective cover according to claim 1, further comprising:

a third flat covering element provided with a respective opening for passage of said operating member; and a second intermediate frame between said at least one second and said third covering element, configured to allow mutual sliding of said flat elements along the two mutually orthogonal directions, wherein said guide and retaining means further comprises:

a third pair of linear guides connected with said at least one second flat covering element and arranged along said second direction, a fourth pair of linear guides connected with said second frame and arranged along said first direction, a third pair of blades connected with said second intermediate frame and arranged along the first direction, said third pair of blades being slidingly associated with said third pair of linear guides, and a fourth pair of blades connected with said third flat covering element and arranged along the second direction, said fourth pair of blades being slidingly associated with said fourth pair of linear guides.

3. The flat protective cover according to claim 2, said first and third pair of linear guides face the respective openings of said at least one first and said at least one second flat covering element;

said second and fourth pair of linear guides face the side opposite said first and third pair of linear guides;

said second and fourth pairs of blades face the respective openings of said at least one second and said third flat covering element; and said first and third pair of blades face the side opposite said second and fourth pair of blades.

4. The flat protective cover according to claim 2, wherein the flat covering elements, the intermediate frames, and the guide and retaining means are configured to produce a modular sequence of appropriate extension.

5. The flat protective cover according to claim 1, wherein said linear guides are elongated elements with an L-shaped section.

6. The flat protective cover according to claim 1, wherein said blades are made by depressed portions, produced in a thickness of said flat covering elements and of said intermediate frames.

7. The flat protective cover according to claim 1, wherein said guide and retaining means comprise sliding means for reducing sliding friction between the parts in mutual contact.

8. The flat protective cover according to claim 1, further comprising means for cleaning, made of flexible material, associated with the face of the flat covering elements facing the zone to be protected, and arranged at least along one outer side of said flat elements.

9. The flat protective cover according to claim 8, wherein said cleaning means act on the face, facing opposite the zone to be protected, of the flat element to which the cleaning means is adjacent, and the thickness thereof is substantially equal to the thickness of the intermediate frame arranged between said adjacent elements.

10. The flat protective cover according to claim 1, wherein the intermediate frame delimits an intermediate opening between the first flat covering element and the second flat covering element to allow the mutual sliding of the first and second flat covering elements along the mutually orthogonal first and second directions.

11. The flat protective cover according to claim 1, wherein the first pair of linear guides and the first pair of blades cooperate with one another, and the second pair of linear guides and the second pair of blades cooperate with one another, in planes parallel to planes of the covering elements.

* * * * *